Nov. 2, 1926.

H. E. MAYNARD

REAR MOTOR SUPPORT

Filed March 9, 1925

1,605,126

INVENTOR
Howard E. Maynard
BY
ATTORNEY

Patented Nov. 2, 1926.

1,605,126

UNITED STATES PATENT OFFICE.

HOWARD E. MAYNARD, OF DETROIT, MICHIGAN, ASSIGNOR TO CHRYSLER CORPORATION, OF HIGHLAND PARK, MICHIGAN, A CORPORATION OF DELAWARE.

REAR MOTOR SUPPORT.

Application filed March 9, 1925. Serial No. 14,052.

It is a primary object of my invention to provide a rear motor support for internal combustion engines wherein the metal of the engine supporting arms and the frame supporting elements are completely insulated from each other by rubber or some other resilient and cushioning material, so as to dampen vibration manifested from the engine to the frame.

It is a further object of my invention to so construct my improved device that the rubber insulation will not be disintegrated in use.

With the above and other objects in view, my invention consists in the arrangement, combination and construction of the various parts of my improved device as described in the specification, claimed in my claim and shown in the accompanying drawing in which;

Figures 1, 2:
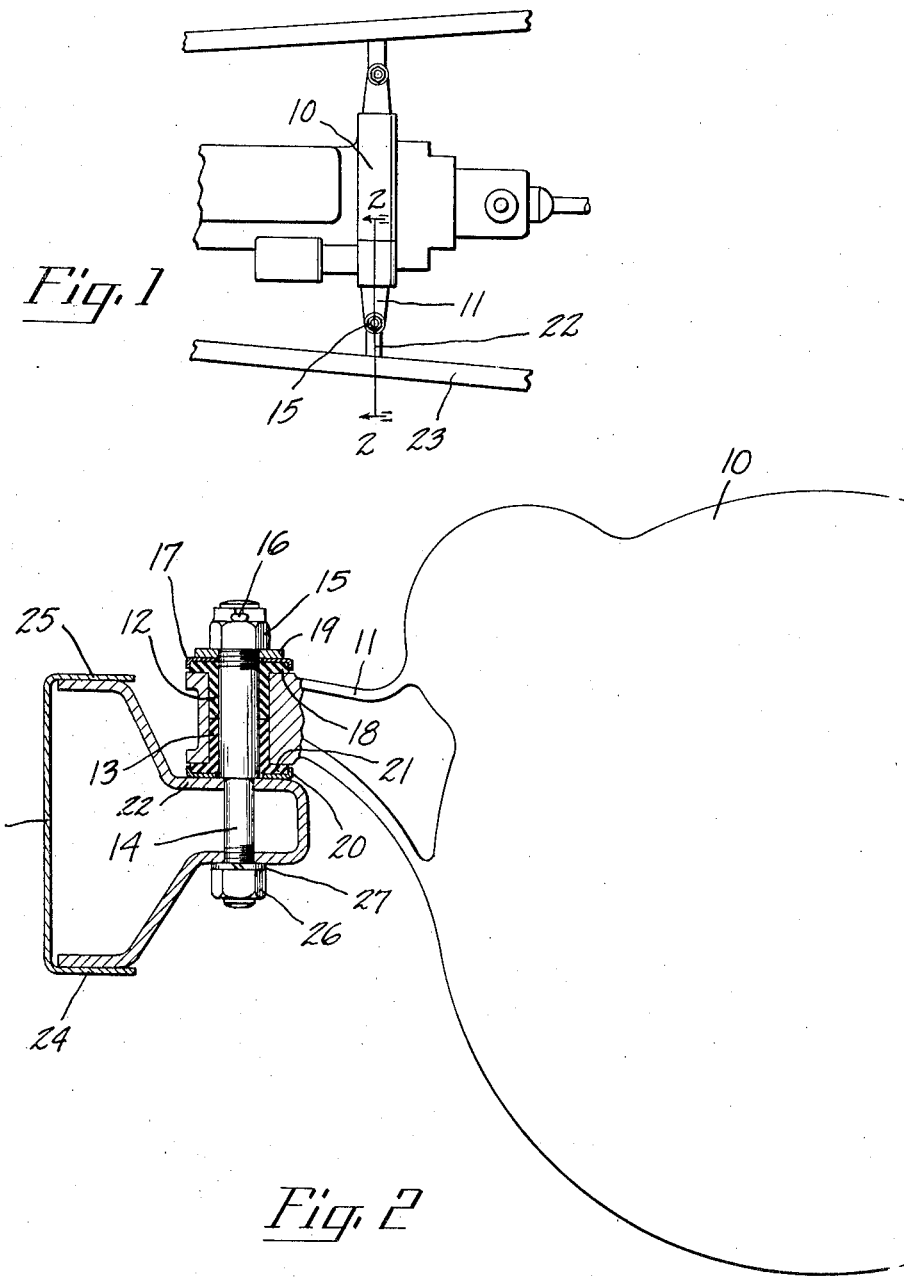
Fig. 1 is a top or plan view of my improved device.
Fig. 2 is a sectional view taken on line 2—2 of Fig. 1.

I have shown a motor or internal combustion engine indicated diagrammatically as 10, having rear support arms 11, the ends of which arms are provided with apertures within which are positioned a pair of flanged rubber sleeves 12 and 13. Extending thru the sleeves 12 and 13 is a bolt 14 having a nut 15 secured on one end thereof by a cotter pin 16. A flanged or dished metal washer 17 is provided over the flanged portion 18 of the sleeve 12 and a flat washer 19 is positioned between the bottom of the nut 15 and the top of the washer 17. A similar flanged or dished washer 20 is provided under the flanged portion 21 of the sleeve 13, the bottom of which washer bears upon the top of the frame arm 22, which is secured to the bottom and top flanges 24 and 25 of a flanged side member 23. A nut 26 is provided on the bottom of the bolt 14 with a lock washer 27 positioned between it and the bottom of the arm 22.

The rubber sleeves 12 and 13 are of such length that when assembled as shown it will be necessary to slightly compress them between the flanged washers 17 and 20 so that no movement of the sleeves between the end of the arms 11 and the bolts 14 will take place except in the flexing of the rubber itself. In other words there will be no chafing action upon the rubber so as to chip or otherwise disintegrate it.

The flanged washers 17 and 20 serve to confine the rubber within certain limits. It will be noted that the ends of the flanges are slightly spaced from the adjacent faces of the arm ends so as to permit vibration absorption by the rubber without contact of the metal washers with the metal arms.

It will be obvious that various changes may be made in the arrangement, combination and construction of the various parts of my improved device without departing from the spirit of my invention, and it is my intention to cover by my claim any such changes as may be reasonably included within the scope thereof.

What I claim is:

In combination, an internal combustion engine having oppositely disposed supporting arms, frame side members, apertures in said arms, bolts extending through said apertures and connected with said frame members, resilient sleeves around said bolts insulating them from said arms, top and bottom flanges on said sleeves insulating the heads of the bolts and the frame connections from said arms, and flanged washers disposed around said bolts adjacent said flanges adapted to hold said flanges against excess spreading.

HOWARD E. MAYNARD.